US008267766B2

(12) United States Patent
Lazar

(10) Patent No.: US 8,267,766 B2

(45) Date of Patent: Sep. 18, 2012

(54) SECURITY SYSTEM AND METHOD FOR LOTTERY TICKETS

(75) Inventor: Stephen Lazar, Tampa, FL (US)

(73) Assignee: GTECH Printing Corporation, Providence, RI (US)

( * ) Notice: Subject to any disclaimer, the term of this patent is extended or adjusted under 35 U.S.C. 154(b) by 691 days.

(21) Appl. No.: 12/361,684

(22) Filed: Jan. 29, 2009

(65) Prior Publication Data

US 2010/0190541 A1 Jul. 29, 2010

(51) Int. Cl.
*A63F 3/06* (2006.01)
*G06K 19/067* (2006.01)

(52) U.S. Cl. .......... 463/17; 235/375; 235/440; 235/441; 235/451; 235/492

(58) Field of Classification Search .................... 463/17; 235/375, 440, 441, 451, 492; 340/5.2
See application file for complete search history.

(56) References Cited

U.S. PATENT DOCUMENTS

| | | | | |
|---|---|---|---|---|
| 5,818,026 | A * | 10/1998 | Melling et al. | 235/470 |
| 5,935,000 | A | 8/1999 | Sanchez, III et al. | |
| 6,875,105 | B1 * | 4/2005 | Behm et al. | 463/17 |
| 7,153,206 | B2 * | 12/2006 | Bennett, III | 463/17 |
| 7,374,484 | B2 | 5/2008 | Bennett, III | |
| 7,527,556 | B2 * | 5/2009 | Amada et al. | 463/17 |
| 7,749,080 | B2 * | 7/2010 | Szrek et al. | 463/29 |
| 7,997,581 | B2 * | 8/2011 | Brennan | 273/269 |
| 2003/0042306 | A1 * | 3/2003 | Irwin et al. | 235/441 |
| 2004/0029630 | A1 * | 2/2004 | Walker et al. | 463/17 |
| 2005/0096130 | A1 * | 5/2005 | Mullins | 463/27 |
| 2006/0180673 | A1 * | 8/2006 | Finnerty et al. | 235/491 |
| 2007/0021191 | A1 | 1/2007 | White et al. | |

OTHER PUBLICATIONS

ISA/US, International Search Report and Written Opinion, PCT/US2009/067905, Feb. 24, 2010.

* cited by examiner

*Primary Examiner* — Zandra Smith
*Assistant Examiner* — Tsz Chiu
(74) *Attorney, Agent, or Firm* — Williams Mullen P.C.; Thomas F. Bergert

(57) ABSTRACT

A system and method of printing lottery tickets produces a prize structure with ticket books containing all available prizes. A game generation file is then generated withholding the high tier prizes. A list of validation numbers is then created from ticket books that hold only low tier winning ticket values. In one embodiment, only validation numbers associated with tickets having no redemption value are included in the list Individual validation numbers are then selected at random from the created list of validation numbers, and high tier ticket prize data is assigned to each record associated with a selected validation number. The information is stored in a new file that can be contained on a separate file server from the original generation file, invoking increased access control and monitoring for additional security purposes. The new file contains the raw ticket data that is used in the printing of the tickets.

23 Claims, 9 Drawing Sheets

FIG. 1
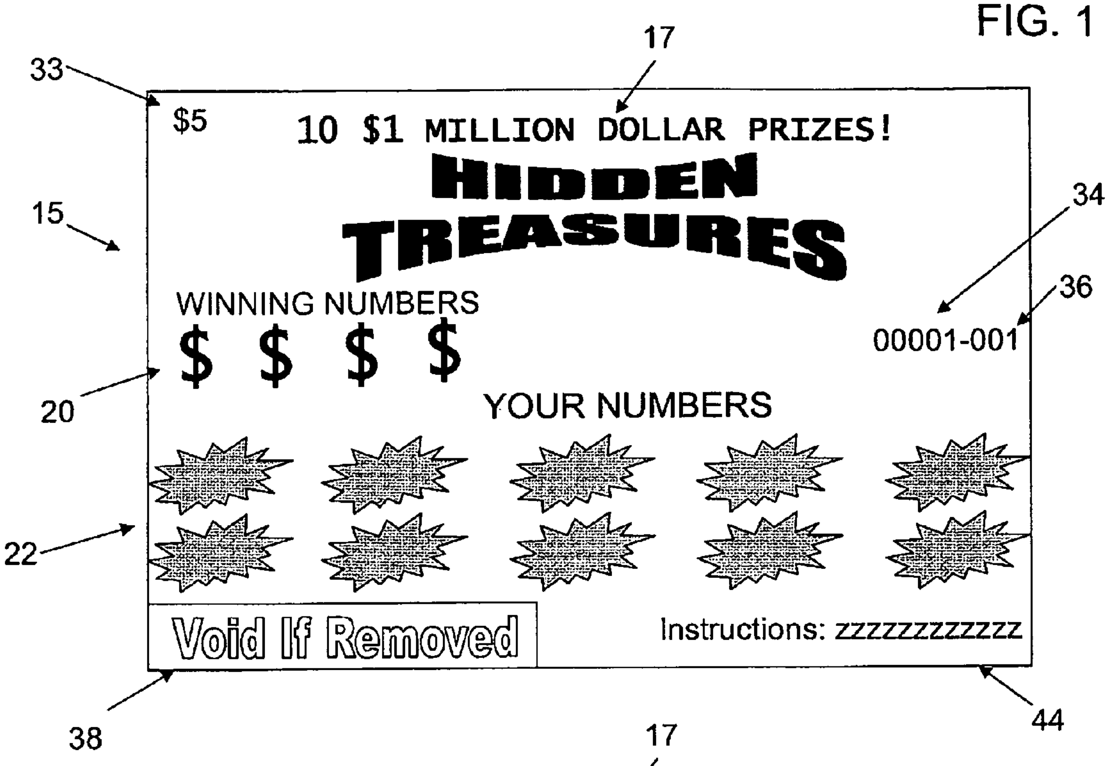
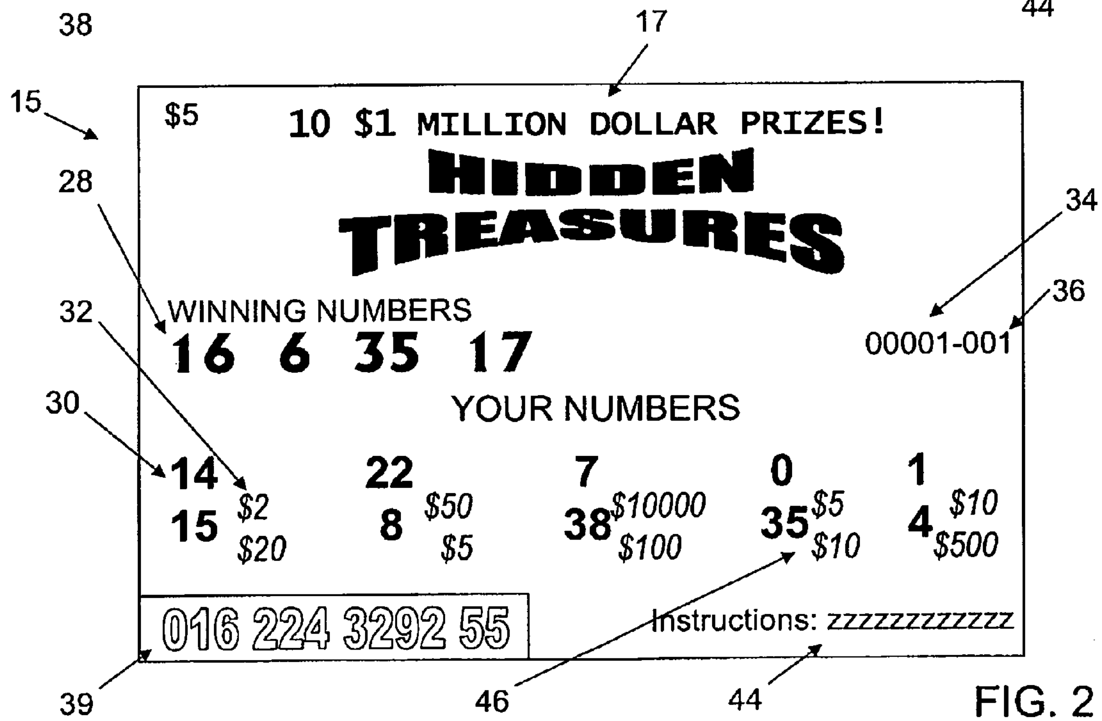
FIG. 2

FIG. 4

62

| Ways to Win | Prize | Winners per game | Probability of Winning | |
|---|---|---|---|---|
| $1,000,000 | $1,000,000 | 10 | 1 in | 3,024,000 |
| $1,000 times 10 Diamond | $10,000 | 210 | 1 in | 144,000 |
| $1,000 times 10 | $10,000 | 210 | 1 in | 144,000 |
| $10,000 | $10,000 | 210 | 1 in | 144,000 |
| $100 times 10 Diamond | $1,000 | 1,680 | 1 in | 18,000 |
| $100 times 10 | $1,000 | 1,680 | 1 in | 18,000 |
| $500 times 2 | $1,000 | 1,680 | 1 in | 18,000 |
| $1,000 | $1,000 | 1,680 | 1 in | 18,000 |
| $50 times 10 Diamond | $500 | 8,400 | 1 in | 3,600 |
| $50 times 10 | $500 | 5,250 | 1 in | 5,760 |
| ($50 x 6) plus ($100 times 2) | $500 | 5,250 | 1 in | 5,760 |
| $100 times 5 | $500 | 5,250 | 1 in | 5,760 |
| $500 | $500 | 5,250 | 1 in | 5,760 |
| $20 times 10 Diamond | $200 | 8,400 | 1 in | 3,600 |
| $20 times 10 | $200 | 6,300 | 1 in | 4,800 |
| ($20 x 5) plus ($50 x 2) | $200 | 6,300 | 1 in | 4,800 |
| $50 times 4 | $200 | 6,300 | 1 in | 4,800 |
| $200 | $200 | 5,250 | 1 in | 5,760 |
| $10 times 10 Diamond | $100 | 20,160 | 1 in | 1,500 |
| $10 times 10 | $100 | 20,160 | 1 in | 1,500 |
| $20 times 5 | $100 | 20,160 | 1 in | 1,500 |
| $50 times 2 | $100 | 20,160 | 1 in | 1,500 |
| $100 | $100 | 20,160 | 1 in | 1,500 |
| $5 times 10 Diamond | $50 | 20,160 | 1 in | 1,500 |
| $5 times 10 | $50 | 20,160 | 1 in | 1,500 |
| ($5 times 8) plus $10 | $50 | 20,160 | 1 in | 1,500 |
| $10 times 5 | $50 | 20,160 | 1 in | 1,500 |
| $50 | $50 | 20,160 | 1 in | 1,500 |
| $5 times 8 | $40 | 60,480 | 1 in | 500 |
| $10 times 4 | $40 | 60,480 | 1 in | 500 |
| $20 times 2 | $40 | 40,320 | 1 in | 750 |
| $40 | $40 | 40,320 | 1 in | 750 |
| $2 times 10 Diamond | $20 | 120,960 | 1 in | 250 |
| ($2 times 5) plus ($5 times 2) | $20 | 120,960 | 1 in | 250 |
| $5 times 4 | $20 | 120,960 | 1 in | 250 |
| $10 times 2 | $20 | 120,960 | 1 in | 250 |
| $20 | $20 | 120,960 | 1 in | 250 |
| $2 times 5 | $10 | 806,400 | 1 in | 37.50 |
| $5 times 2 | $10 | 806,400 | 1 in | 37.50 |
| $10 | $10 | 806,400 | 1 in | 37.50 |
| $5 | $5 | 2,822,400 | 1 in | 10.71 |
| Total Number of Winners | | | 6,318,910 | |
| Total Probability of Winning | | | 1 in | 4.79 |

60

50 51 52 53 54 55

| Game # | Book # | Ticket # | Valid. # | Barcode | Play code |
|---|---|---|---|---|---|
| 44 | 16 | 1 | 82101663 | 0441600182101663 | GA659X42OPI |
| 44 | 16 | 2 | 54631192 | 0441600254631192 | X42VV39010B |
| 44 | 16 | 3 | 01663434 | 0441600301663434 | 2PO11439HR4 |
| • | • | • | • | • | • |
| • | • | • | • | • | • |
| • | • | • | • | • | • |
| 44 | 16 | 100 | 63821016 | 0441610063821016 | YH423Z33OIP |

48

FIG. 6

SECURITY SYSTEM AND METHOD FOR LOTTERY TICKETS

FIELD OF THE INVENTION

The present invention relates to lottery tickets and more particularly to a security system and method for reducing fraudulent practices pertaining to lottery tickets.

BACKGROUND OF THE INVENTION

Instant lottery tickets issued by lottery service providers and/or lottery ticket manufacturers permit various levels of winning according to a pre-defined prize structure. The prize structure usually includes high-tier winning tickets (e.g., redemption value of $600 and up), mid-tier winning tickets (e.g., redemption value of between $26 and $599 inclusive), low-tier winning tickets (e.g., redemption value of $25 and below) and losing tickets with no redemption (i.e., zero) value. Depending upon the structure, fewer or additional tiers may also exist. The winning tickets are randomly dispersed throughout a pool of tickets, with each pool of tickets being sub-dividable into books that are distributed to lottery ticket retailers. As an example, one pool of lottery tickets may include 300,000 tickets comprising 3,000 books having 100 tickets each.

The physical tickets themselves typically comprise a game card with a game play area on one face of the card, as illustrated in FIGS. 1 and 2, for example. As shown therein, the game play area 15 is typically printed on the game card and provided with one or more scratch-off locations 20, 22 that are covered by a coating such as latex or acrylic resin. Game elements that help determine the outcome of the game appear underneath the coatings. For example, game elements can include winning numbers 28 that are to be matched by player numbers 30 to win an associated prize 32.

For accounting, inventory, tracking and security purposes, the ticket can also be provided with a book number identifier 34, a ticket number 36 and a validation code element or validation number 39 while validation number 39 is shown as a numeric character, it will be appreciated that alpha-numeric characters or other types of codes can be used as the validation number. The book number and ticket number can be shown together and referred to as the "book-ticket" number in one embodiment of the present invention. These elements can appear on the front or back of the ticket depending upon the implementation. In some cases, a coded ticket identification symbol can be applied to the card instead of the book number and ticket number for security purposes. Further, a scannable barcode can be provided on the ticket (usually on the back) to represent the ticket identifying information and/or validation number. In past ticket printing methods, a scratch off coating (e.g., 38) would typically cover the validation code, and the card would typically not be honored if any part of the coating above the validation number 39 was detectably altered or removed prior to redemption. Labels such as "VOID IF REMOVED" were also commonly placed on these portions of the card to appropriately warn the player as shown in FIG. 2. While present day ticket printing methods typically place the validation number (aka "VIRN") under the scratch-off coating in the game play area, such that it is revealed when the user scratches off the game play coverings, it will be appreciated that the present invention encompasses either form of presenting the validation number on the ticket.

Instructions 44 for playing the game can also appear on the face of the card, along with, for example, the game name, game number, purchase price of the ticket 33, number and amount of highest winning prizes available for the game (i.e., call out 17), total amount available to be won, prize claim process, and/or security and verification requirements.

Since the cash value of the ticket is determined at the time of printing, the tickets must be designed and manufactured with appropriate security precautions to avoid ticket fraud. As a result, instant ticket games are typically designed with several security features to prevent tickets from being tampered with, forged or counterfeited. The security features employed in ticket design usually pertain to the validation number printed on the ticket and the coating applied to the play areas 15 of the ticket. It is understood that a key to controlling game security is to generate and use validation numbers that reveal no information about the winning status or amount of the ticket.

The ticket manufacturing process can employ different levels of security. In what has been called "single pass security," there is a defined relationship between the ticket identification information (e.g., book number and/or ticket number) and the redeemable value of each ticket, wherein the relationship is stored in a computer file. One who knows the validation number or other ticket identification information can then determine the ticket's value if he or she has access to the computer file. As a basic example, in considering a table of values, one with access to the computer file can simply look up the validation number (or ticket number from the identification information) and see what ticket value is associated with the ticket having that validation number. As an alternative, one can run a computer program that opens the computer file and performs an algorithm to determine the value associated with a ticket having a given validation number or given ticket identification information.

In a more sophisticated form of security, often called "dual security," the relationship between the ticket value and ticket identification information is eliminated. Using this approach, one cannot ascertain a ticket's value by merely using the ticket identification information. Instead, the book number generated by the game generation program is converted to a different number, and the different number is then imaged and/or printed onto the ticket. In this way, one could not then use the book number and the file containing game data (i.e., the ticket generation or "gen" file) to ascertain the ticket's value. Nevertheless, the validation number could still be used to determine the ticket's value as in the single pass security example above.

Efforts to improve upon dual security are described, for example, in U.S. Pat. No. 7,374,484 to Bennett, III. The background information describing single pass and dual security is incorporated by reference herein. As described therein, book numbers (i.e., pack numbers) are shuffled in each pool of tickets before the tickets are printed according to a shuffling algorithm, where the shuffle seeds are maintained in an encrypted file or files. One of the stated advantages of this "keyed dual security" approach is that it severs the relationship of the ticket identification information with the ticket value, such that would-be illicit activities can be thwarted.

A primary disadvantage of such keyed dual security efforts is that there still remains a relationship between the book number and the existence of high-tier, mid-tier and low-tier winning tickets. Thus, for example, suppose that 3,000 books of lottery tickets, with 100 tickets per book, are printed and ticket book number one contains a high-tier winning ticket. This ticket book number can be shuffled such that a different ticket book number, e.g., #2168, is actually printed on the ticket, and is now different from the book number stored on the computer file for this book. Even though the book number has been shuffled, an unscrupulous lottery employee or a knowledgeable player with access to the original generation file can use a validation number (e.g., by scratching off the latex coating) or book number on the ticket to determine which book that ticket is associated with, and then subsequently determine whether that book of tickets has a high-tier prize associated with it.

If so, then the player may subsequently purchase the remaining book of tickets in an effort to obtain the ticket with the high-tier prize. Since books are sold in units to retailers, the player will likely need to simply purchase the remaining tickets from the book at the same retailer location. Even if the book number has changed, that is irrelevant to the player, because the player knows that there is a high-tier winner in the book that he has located by chance.

SUMMARY OF THE PRESENT INVENTION

The present invention overcomes such problems of keyed dual security systems by providing a system and method of printing lottery tickets that first generates the game generation file without including the high-tier prizes. This file can be verified using a verification program. The original generation file also creates a list of validation numbers from books that do not have any high and/or mid-tier winning tickets. In other words, the list of validation numbers only comes from books that have low-tier winning tickets. In one embodiment, only validation numbers associated with zero-value tickets from within the identified books are incorporated into the list. Validation numbers are unique for all tickets in a game and are hidden under the coating in the printing process as is known in the art.

Next, the present invention utilizes a second and separate secured process that selects validation numbers randomly from the created list, and assigns high-tier ticket data to the record containing the selected validation numbers. Thus, the zero-value ticket has been replaced with a high-tier value ticket. The information is stored in a new or second generation file that can be contained on a separate file server from the original generation file, invoking increased access control and monitoring for additional security purposes. This new generation file contains the raw ticket data that is used in the printing of the tickets, and this file can be verified using object code from the original verification program.

Accordingly, book numbers need not be shuffled or modified. Nevertheless, the high-tier prizes have been seeded in places unknown by the original generation file, and further the high-tier prize data has been disconnected from the other tickets originally generated in the same book. Those with access to the original generation file cannot gather any information on the high-tier prizes or re-create the high-tier seeded data file.

In a further aspect of the present invention, the ticket reconstruction process can be preserved and similarly separated into two steps. The book-ticket number is passed to a computer program that can determine the validation number originally assigned to that book-ticket number. A second and separate secured process then uses the validation number to determine the value of the ticket.

BRIEF DESCRIPTION OF THE DRAWINGS

FIGS. 1 and 2 show an example lottery ticket such as might be employed in connection with the present invention.

FIG. 4 shows a table with an exemplary prize structure.

FIG. 6 illustrates a table of values that can appear in a generation file in accordance with one aspect of the present invention.

DETAILED DESCRIPTION OF THE PREFERRED EMBODIMENTS

Figure 3:
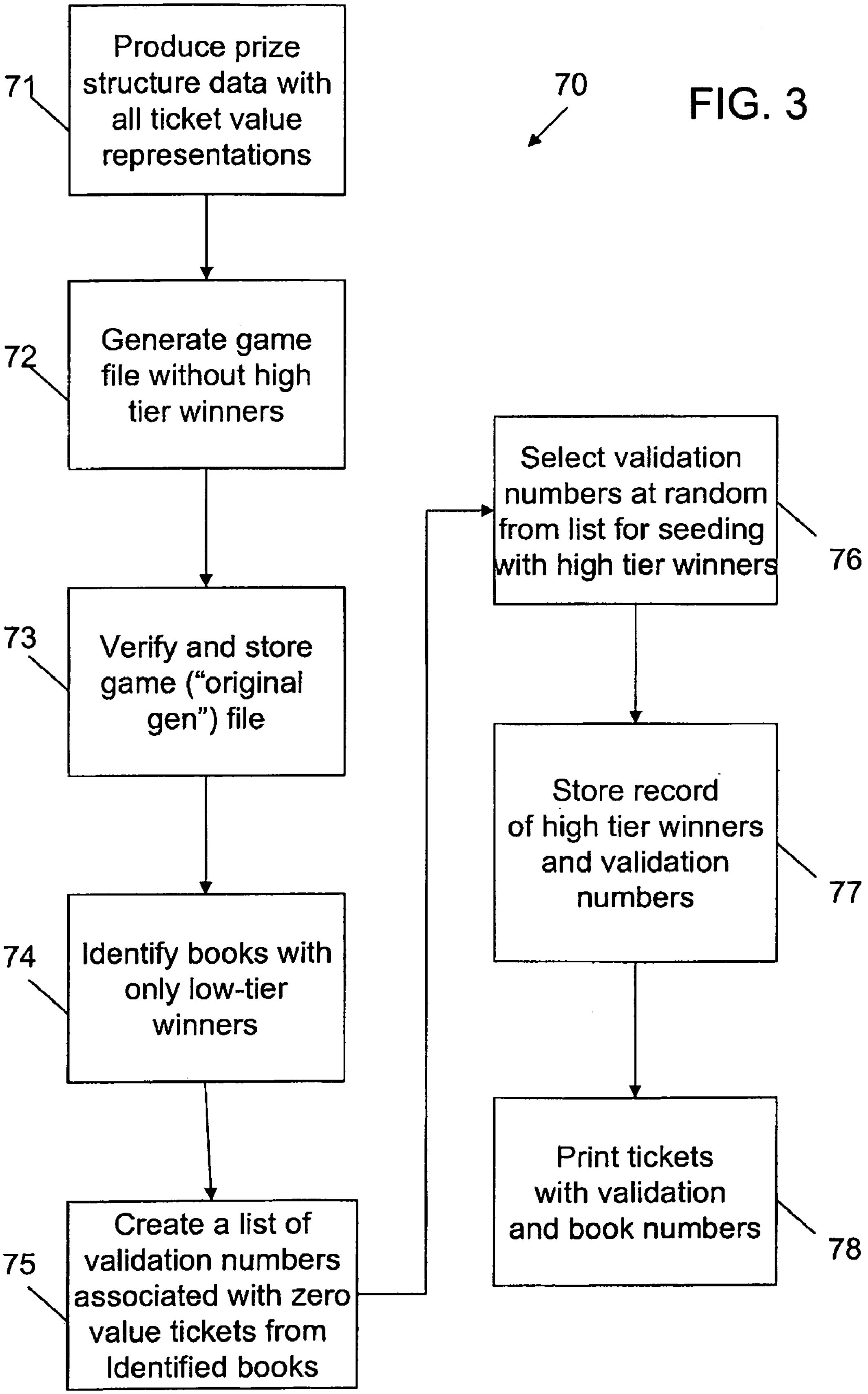
FIG. 3 is a flow diagram illustrating a lottery ticket manufacturing process in accordance with the present invention.

The present invention employs security processes to assist in preventing fraudulent practices with lottery ticket games. As shown in the flow diagram 70 of FIG. 3, the present invention first produces prize structure data associated with a lottery ticket game as at step 71. The prize structure data includes a distribution of winning tickets and winning ticket amounts for a predetermined number of tickets to be employed in a game. FIG. 4 shows a table 60 of an exemplary prize structure for a lottery ticket game, based on a total ticket generation of 32,400,000 tickets. The prize values (i.e., ticket value representations) 62 are determined and associated with individual tickets in random fashion. Typically, lottery tickets will be separated out into multiple pools, with each pool having multiple books of tickets. Thus, using the exemplary prize structure shown in table 60 of FIG. 4, the 32,400,000 tickets could be divided into 10 pools of 3,240,000 tickets. Each pool could have 32,400 books, with each book having 100 tickets. It will be appreciated that the specific numbers being used are for illustration only, and specific implementations of the present invention can differ greatly in the number of tickets, pools and/or books without differing from the spirit of the invention disclosed and claimed herein.

Other information can be represented in the prize structure table 60 that may or may not be used in printing individual lottery tickets, such as, for example, odds of winning each prize, total odds of winning, number of winners per pool and total prize money available. In one embodiment of the present invention, there are high-tier winning tickets, low-tier winning tickets and zero value tickets only in the prize structure. In another embodiment of the present invention, there are high-tier, mid-tier, low-tier and non-winners. It will be appreciated that the present invention can accommodate any distribution and categorization of ticket prize structures and the present disclosure is illustrative of specific examples and should not be considered to be the only implementations available.

Figure 5:
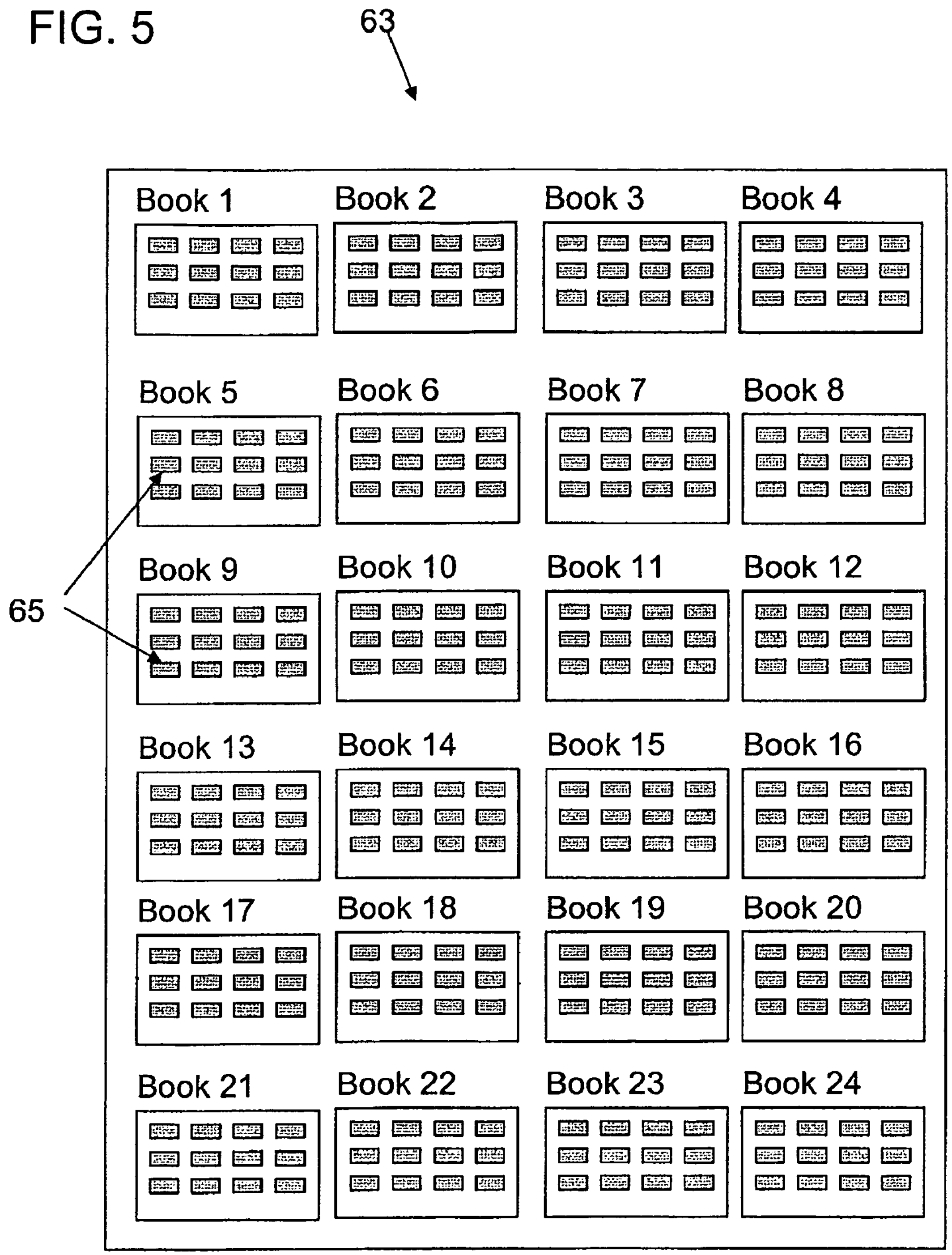
FIG. 5 shows a sample pool of tickets illustrating the division of a pool of tickets into multiple books having multiple tickets each.

The present invention employs an appropriate prize structure generation program associated with a game generation program in order to develop a given prize structure for a game having a predetermined number of tickets for a lottery game. In one embodiment of the present invention, the prize structure is generated such that each pool contains an equal percentage of prizes in each category. Thus, with reference to the table 60 in FIG. 4, for example, if the prize structure shown is distributed over ten pools of tickets, then there would be one $10 million winner per pool, twenty-one $10 thousand dollar winners per pool and so forth. Once the prize structure is developed, the game generation program of the present invention can generate the original generation file of game data so as to populate each ticket with a ticket value representation associated with the prize structure, with the exception that any high-tier prize data would be excluded from the original generation file as described more completely hereafter. In the embodiment where multiple pools are involved, the game generation program uses the prizes per pool information to generate the ticket value representation for each ticket within the pool. Thus, instead of placing $10 winning ticket value representations among 806,400 tickets, the game generation program would place $10 winning ticket value representations in 80,640 tickets in a pool. Such a process can more equally distribute prizes among the multiple pools. FIG. 5 represents an illustration of a different and simplified pool 63 having twenty-four individually labeled books of twelve tickets each. Each ticket is represented by a rectangle (e.g., 65) within a book.

With reference back to FIG. 3 at step 72, the game generation program of the present invention then generates game data to be stored in a computer file (i.e., game generation file or "gen file"). The gen file created by the game generation program includes a record for each ticket organized according to pool, book or pack number and ticket number. FIG. 6 is a table 48 showing an example extract of such a gen file, showing the game number at 50, the book number at 51, the ticket number at 52, the validation number at 53, the barcode representation at 54 and the game play/play code information 55 that includes the cash value of the ticket. In one embodiment of the present invention, the play code information 55 is not coded but directly shows the winning redemption value of the ticket (e.g., $0, $5, $10). Either way, the play code information or actual redemption value of the ticket acts as the ticket value representation for the ticket. In another embodiment of the present invention, the gen file created and recorded includes only a validation number and a ticket value representation, with ticket identifying information not being stored. In accordance with the present invention and as shown at step 72, the original gen file of game data is created without including high-tier winners/prizes. Thus, while the gen file creates records associated with each ticket for the predetermined number of tickets, it does not include any of the predetermined high-tier winners or their ticket value representations. Instead, the original gen file includes zero-value (or optionally low-tier) ticket value representations for each instance where a high-tier winning ticket value representation would otherwise appear. As a result, anyone with access to the original gen file would not be able to determine which ticket or book number held a high tier prize.

It will be appreciated that the designation of what constitutes a high-tier, mid-tier or low-tier ticket value representation can change from implementation to implementation. For example, one implementation of the present invention can designate a high-tier winning ticket value as anything $600 or above, while another may designate a high-tier value as anything $1,000,000 or above. In the latter example, mid-tier winning ticket value representations could encompass prizes between $10,000 and $1,000,000. Regardless of implementation, the original gen file would include zero-value or optionally low-tier ticket value representations for the selected high-tier ticket value representations from the original prize structure data.

It will further be appreciated that at least some of the originally generated ticket value representations will correspond to the ticket value representations associated with the prize structure data for the game. For example, the originally generated ticket value representations can include the zero, low-tier and mid-tier ticket value representations from the prize structure data. In the embodiment of the present invention without mid-tier ticket value representations, the originally generated ticket value representations would therefore only include the zero and low-tier value representations from the prize structure data.

Once created, the original gen file information is then verified using a verification program and stored, as illustrated in step 73. In one embodiment of the present invention, the gen file data is stored in a first storage location kept secure and separate from other information described herein. As at step 74, the present invention then proceeds to identify books containing only low-tier winning tickets (i.e., no mid-tier winning tickets). These are the books from which high-tier winning tickets will eventually be found. In performing this step, the present invention essentially overlooks the books already laden with rid-tier winning ticket value representations so as not to overpopulate such books with an inordinate number of higher value (i.e., non low-tier) winning tickets. Once the books with only low-tier winning tickets are located, a list of the validation numbers for the tickets having zero-value within such books is created, at step 75. From that list, one or more validation numbers are randomly selected for seeding with high tier winning prize data, as at step 76. A computer program running a suitable algorithm can be used for the random selection of validation numbers. A new record of validation numbers and high tier winning prize data is then stored for each ticket validation number having a high tier prize as at step 77. The game tickets are then printed using this second file having the high tier winning prize data seeded therein, as at step 78. In the embodiment of the present invention where the ticket identifying information is not stored in the original gen file, such ticket identifying information can be stored in the second file, i.e., the high tier seeded data file. Alternatively, the ticket identifying information need not be stored in either file and can be added at the time of printing.

Figure 7:
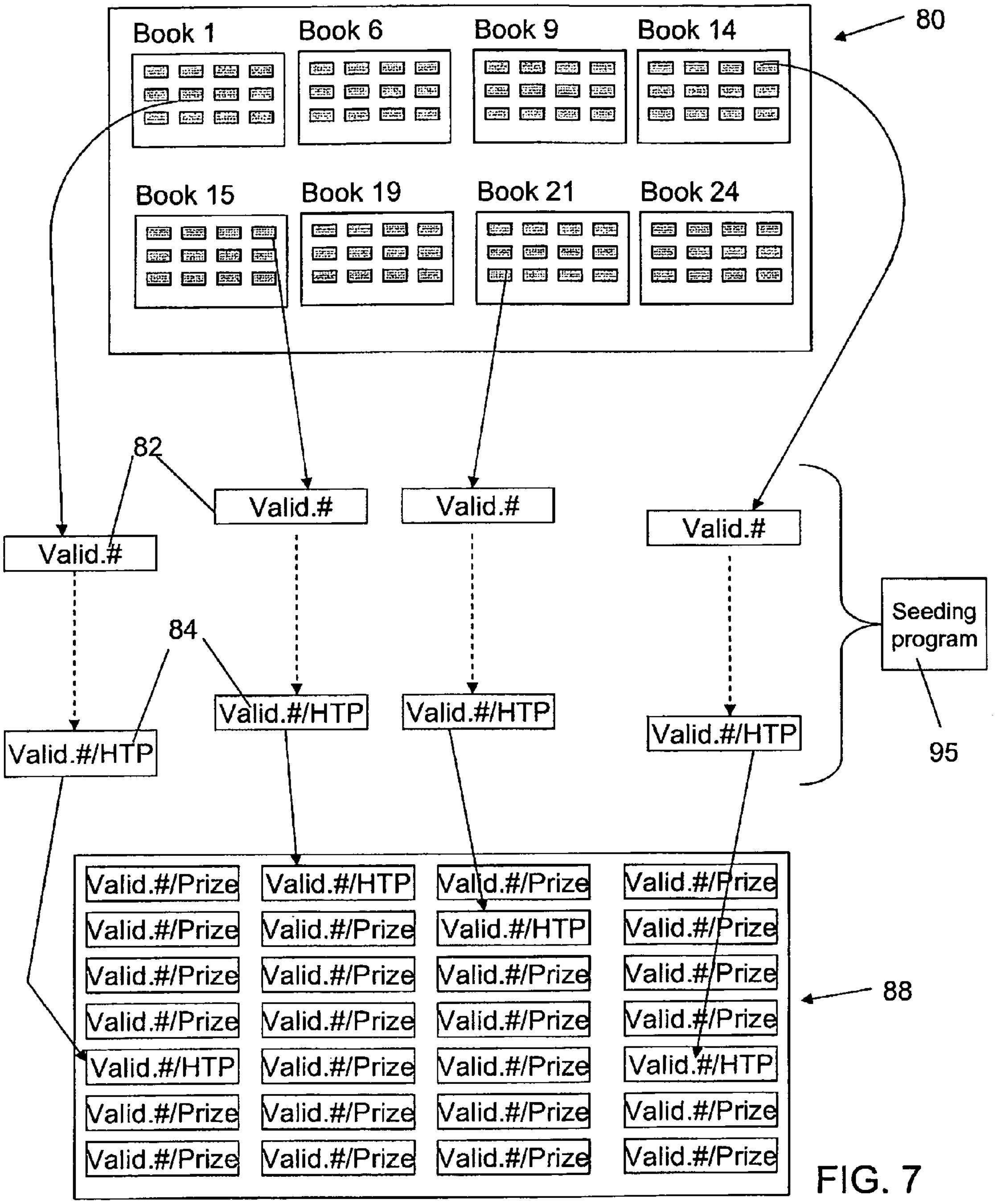
FIG. 7 is a schematic diagram illustrating the high tier winner seeding process in accordance with one aspect of the present invention.

FIG. 7 illustrates the creation of the seeded high tier winner data. As shown therein, the books having only low-tier winning ticket value representations are located and indicated at 80. When the random seeding program 95 is run, the program creates the list of validation numbers associated with the zero-value tickets from the identified books 80, and randomly selects validation numbers (e.g., 82) for associating high-tier winning ticket value representations. High-tier prizes from the prize structure data are then tied to respective validation numbers and new records comprising respective pairs of validation numbers and high-tier ticket value representations are stored in a new file, as indicated at 88. In one embodiment of the present invention, the actual prize information is not stored, but a game play/play code data representation of the prize is stored as the ticket value representation. Thus, instead of storing "$10,000" the field entry might say "DZ7T7513AO9". At this stage, all of the validation numbers from the remaining records in the original gen file and their associated ticket value representations can be stored in the new file containing the high-tier winning prize data. Ultimately, all of the prizes from the prize structure data, and no more and no less, are represented in the new generation file.

Figure 8:
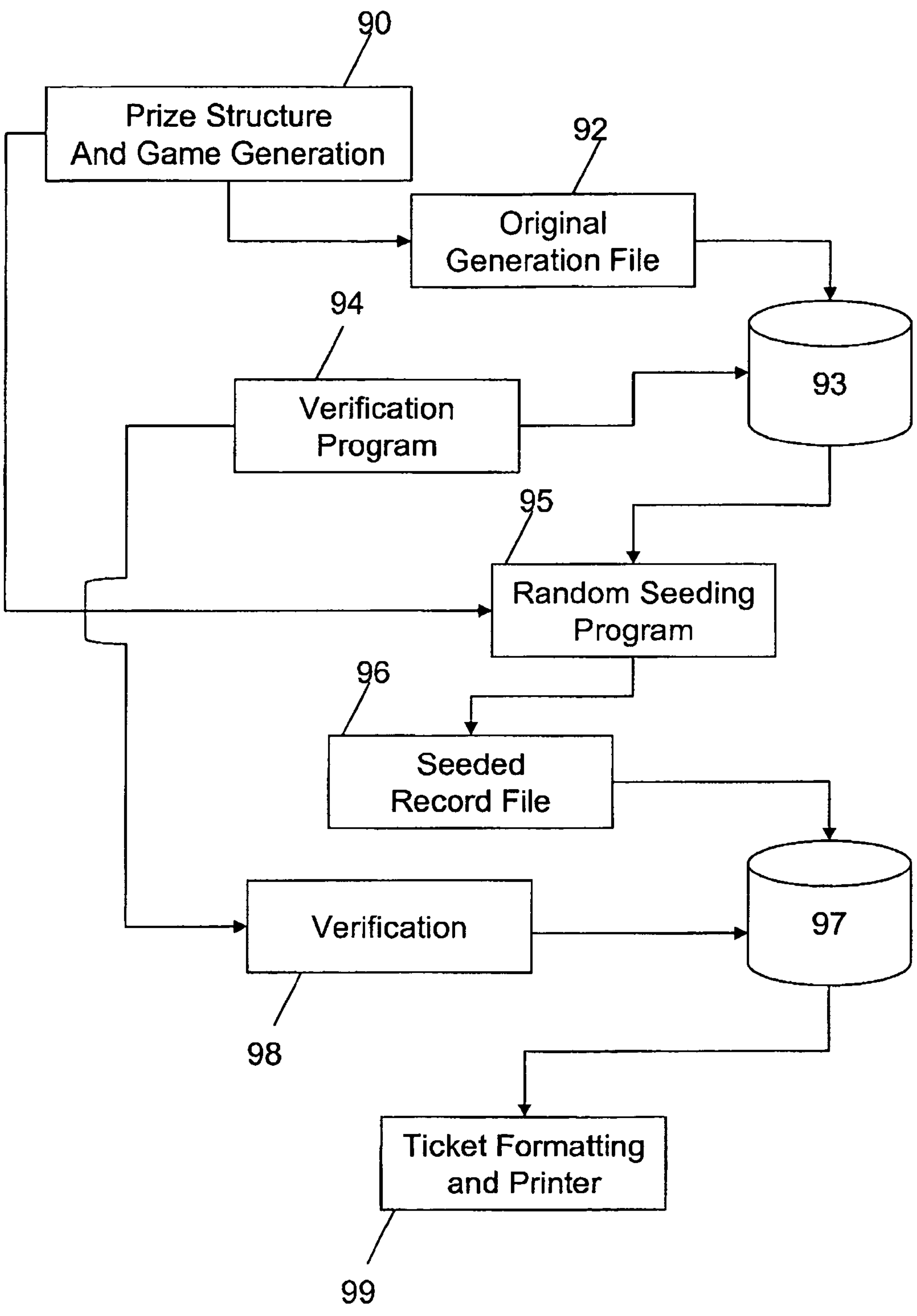
FIG. 8 is a flow diagram illustrating a lottery ticket manufacturing process in accordance with the present invention.
Figure 9:
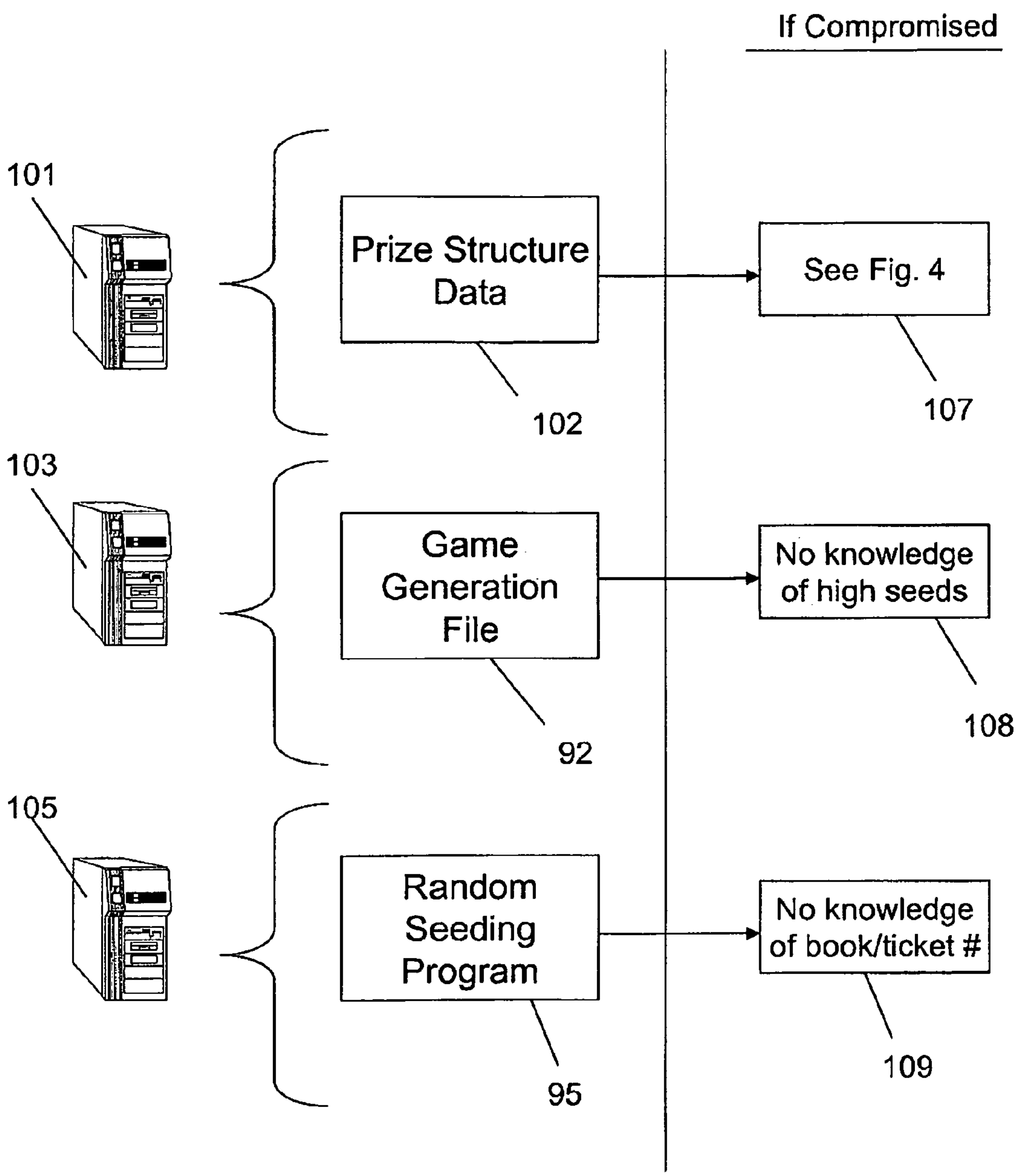
FIG. 9 is a block diagram illustrating the separated storage aspects of one embodiment of the present invention and resulting security benefits.

The block diagram of FIG. 8 illustrates the components employed in one embodiment of the present invention. FIG. 9 is a block diagram illustrating the separated storage aspects of one embodiment of the present invention and resulting security benefits. As shown therein, the prize structure and game generation program 90, which can be separate programs, create the initial game generation file 92, which is stored in database 93. Database 93 can be associated with a first secure server (e.g., 103 in FIG. 9). A verification program 94 verifies the data in the original gen file. The random seeding program 95 then associates high-tier prizes produced by the prize structure program with randomly selected validation numbers from the original gen file to develop the second generation file, i.e., the high-tier seeded data file 96. This file 96 is then stored in database 97, which can be associated with a second secure server (e.g., 105 in FIG. 9) separate and apart from the first secure server (103 in FIG. 9). This file contains the raw ticket data used to print tickets, and the file is verified using object code 98 from the original verification program 94. The raw ticket data file is then formatted and used to print the tickets using printer 99. In printing the tickets, the computer system of the present invention includes programming and hardware that facilitates the placement of the raw ticket data from the seeded file on each ticket. For example, the computer program can operate to direct a printer or image applying device to place the appropriate game data on the ticket paper stock/substrate. It will be appreciated that the method of applying images and printed matter onto a substrate such as instant lottery tickets is well known, and can employ any of a number of printer types, inks and other materials.

It will be appreciated that all file servers involved in the processes of the present invention can be placed on their own sub-network with defined read/write access restrictions. For example, as shown in FIG. 9, there may be a first program, file and/or storage location 101 for prize structure production data 102, a second program, file and/or storage location 103 for the game generation data/original gen file 92, and a third program, file and/or storage location 105 for the random seeding program 95. The second generation file (i.e., high tier seeded data file) 96 can also be stored in another separate storage location. This assists in securing the lottery ticket information developed in the ticket manufacturing process of the present invention. Thus, as shown in FIG. 9, if the prize structure data file 102 is compromised, the holder only knows information 107, which can comprise the data in table 60 of FIG. 4. This information 107 does not associate ticket data with prize winning data. If the original gen file 92 is misappropriated, the holder only knows ticket identifying data and validation numbers associated with non-winning tickets as well as possibly low and/or mid-tier winning tickets as indicated at 108, but does not know information about any high tier winning tickets. If the random seeding program 95 is compromised, whoever has access to it can only determine validation numbers and prize data, or alternatively validation numbers and code data representative of prize data, with no knowledge of book and ticket data, as indicated at 109. Thus, any individual with access to the random seeding program 95 does not gain any knowledge that can help in trying to fraudulently deduce high tier winning tickets or individual books that may hold the high tier winning tickets.

Ticket Reconstruction

Figure 10:
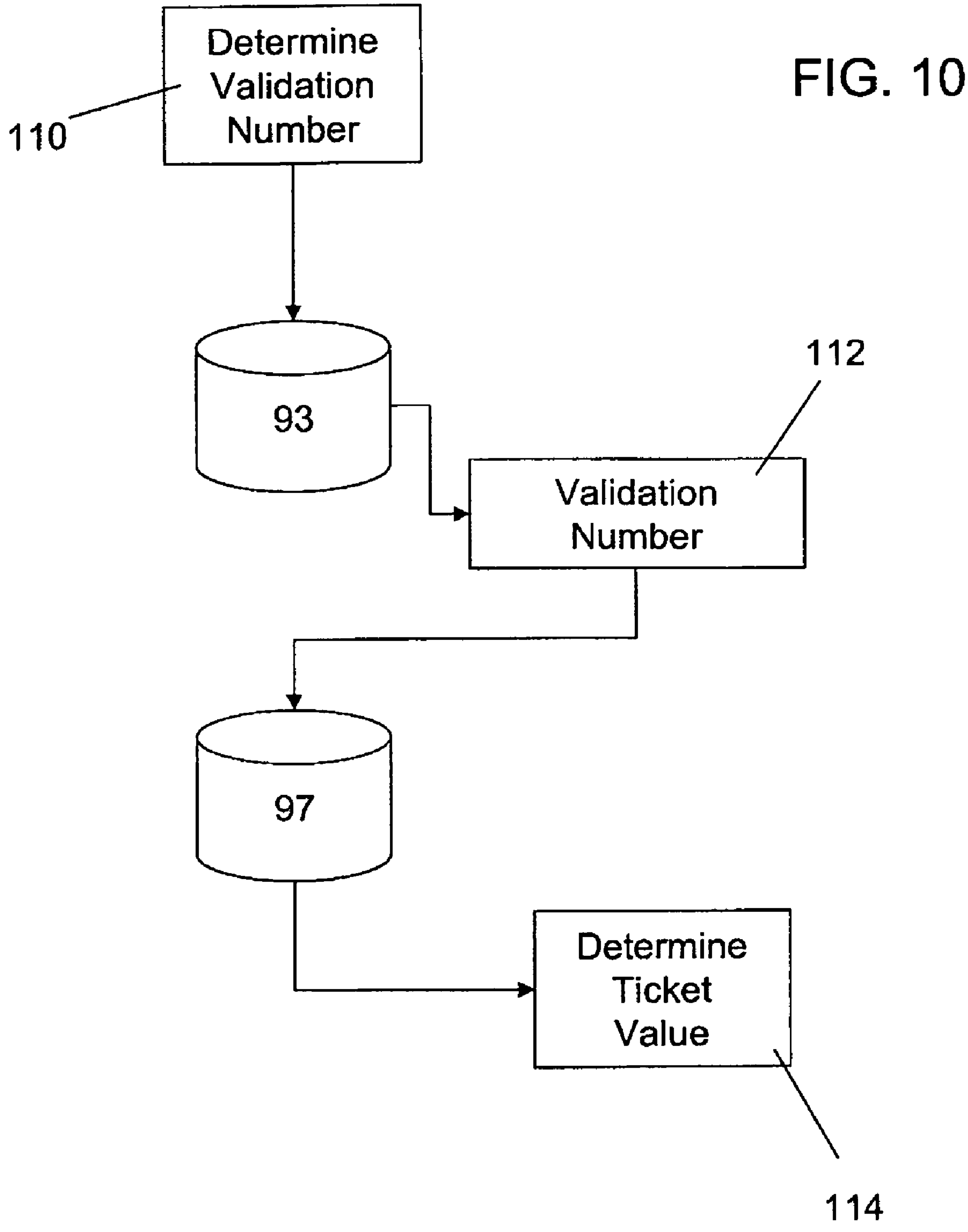
FIG. 10 is a flow diagram illustrating a lottery ticket reconstruction process in accordance with the present invention.

As shown in FIG. 10, when a player attempts to redeem his or her winning ticket, the validation number is determined as at 110, such as by scratching off the coating over the validation number or by scanning the ticket barcode to obtain the book and ticket numbers. The original validation number 112 can be derived by inputting the book and ticket number into programming that accesses the database 93 holding the original gen file. Once obtained, the original validation number 112 can be input into a separate secure program that accesses database 97 with the seeded high tier winning data file 96 to determine the value of the ticket as at 116.

Ticket reconstruction assists lottery operators such as state lotteries by allowing ticket data and/or relevant areas of the play area for a ticket to be re-generated for security and other purposes. For example, when a ticket is partially damaged or when there is a question as to whether a ticket has been illegally altered, the lottery operator can request the ticket vendor or lottery system provider to reconstruct the ticket. The lottery operator may present the book-ticket number, for example, to the vendor or lottery system provider and request the validation number and ticket value for that ticket. Alternatively, the lottery operator may present the book-ticket number and request game play data or a quasi-original looking ticket for verification purposes.

It will be apparent to one skilled in the art that any computer system that includes suitable programming means for operating in accordance with the disclosed methods also falls well within the scope of the present invention. Suitable programming means include any means for directing a computer system to execute the steps of the system and method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system. The present invention can further run on a variety of platforms, including Microsoft Windows™, Linux™, Sun Solaris™, HP/UX™, IBM AIX™ and Java compliant platforms, for example. The present invention can further be operated using multiple computers and/or computer systems communicating over a network, which may be a local area network, wide area network, private or public network, such as the Internet, for example.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A method for improving the security of lottery tickets, comprising the steps of:

generating ticket prize structure data for a lottery game having a predetermined number of lottery tickets, wherein the prize structure data includes a plurality of ticket value representations including at least one high-tier winning value;

producing a ticket generation file of game data, with the game data including a ticket validation number and an originally generated ticket value representation for each of the predetermined number of tickets, but wherein no game data for any of the predetermined number of tickets includes a ticket value representation associated with the at least one high tier winning value;

storing the game data for each ticket in a record associated with each ticket;

selecting a validation number at random from the ticket generation file, identifying the ticket record corresponding to the selected validation number, and replacing the originally generated ticket value representation associated with the corresponding ticket record with a replacement ticket value representation associated with the at least one high tier winning value; and storing the record containing the replacement ticket value representation in a high tier seeded data file.

2. The method of claim 1 wherein at least some of the originally generated ticket value representations correspond to the plurality of ticket value representations associated with the prize structure data.

3. The method of claim 1 wherein the plurality of ticket value representations in the prize structure data include zero, low-tier and high-tier ticket value representations.

4. The method of claim 3 wherein the originally generated ticket value representations include all of the zero and low-tier ticket value representations from the prize structure data.

5. The method of claim 1 wherein the predetermined number of tickets is divided among a plurality of ticket books, and wherein the step of selecting a validation number includes the steps of:

identifying one or more ticket books having only zero and low-tier ticket value representations;

creating a list of validation numbers associated with ticket records having a zero ticket value representation within the identified one or more books; and selecting a validation number at random from the created list of validation numbers.

6. The method of claim 1 wherein the plurality of ticket value representations in the prize structure data include zero, low-tier, mid-tier and high-tier ticket value representations, and further wherein the originally generated ticket value representations include all of the zero, low-tier and mid-tier ticket value representations from the prize structure data.

7. The method of claim 1 wherein the ticket generation file is stored on a first server and the high tier seeded data file is stored on a second server.

8. The method of claim 1 wherein the high tier seeded data file is used to print tickets.

9. The method of claim 8 wherein the high tier seeded data file is created without modifying a book number or shuffling one or more books of tickets.

10. The method of claim 1 wherein the game data includes ticket identifying information.

11. A lottery ticket generation system, comprising:

a lottery game prize structure program for generating ticket prize structure data for a lottery game having a predetermined number of lottery tickets, wherein the prize structure data includes a plurality of ticket value representations including at least one high tier winning value;

a game generation program for producing a ticket generation file of game data, with the game data including a ticket validation number and an originally generated ticket value representation for each of the predetermined number of tickets, but wherein no game data for any of the predetermined number of tickets includes a ticket value representation associated with the at least one high tier winning value;

a first record storage component for storing the game data for each ticket in a record associated with each ticket;

an algorithm for selecting a validation number at random from the ticket generation file, identifying the ticket record corresponding to the selected validation number, and replacing the originally generated ticket value representation associated with the corresponding ticket record with a replacement ticket value representation associated with the at least one high tier winning value; and a second record storage component for storing the record containing the replacement ticket value representation in a high tier seeded data file.

12. The system of claim 11 wherein at least some of the originally generated ticket value representations correspond to the plurality of ticket value representations associated with the prize structure data.

13. The system of claim 11 wherein the plurality of ticket value representations in the prize structure data include zero, low-tier and high-tier value representations.

14. The system of claim 13 wherein the originally generated ticket value representations include all of the zero and low-tier value ticket value representations from the prize structure data.

15. The system of claim 11 wherein the predetermined number of tickets is divided among a plurality of ticket books, and wherein the algorithm selects the validation number by identifying one or more ticket books having only zero and low-tier ticket value representations, creating a list of validation numbers associated with ticket records having a zero ticket value representation within the identified one or more books, and selecting a validation number at random from the created list of validation numbers.

16. The system of claim 11 wherein the plurality of ticket value representations in the prize structure data include zero, low-tier, mid-tier and high-tier ticket value representations, and further wherein the originally generated ticket value representations include all of the zero, low-tier and mid-tier ticket value representations from the prize structure data.

17. The system of claim 11 wherein the ticket generation file is stored on a first server and the high tier seeded data file is stored on a second server.

18. The system of claim 11 where the high tier seeded data file is used to print tickets.

19. The system of claim 18 wherein the high tier seeded data file is created without modifying a book number or shuffling one or more books of tickets.

20. The system of claim 18 wherein the game data includes ticket identifying information.

21. A method for securing lottery tickets, comprising the steps of:

producing a ticket generation file of game data, with the game data including a ticket validation number and an originally generated ticket value representation for a predetermined number of tickets, but wherein no game data for any of the predetermined number of tickets includes a ticket value representation associated with a high tier winning value;

storing the game data for each ticket in a record associated with each ticket; and selecting a validation number at random from the generation file, identifying the ticket record corresponding to the selected validation number, and replacing the originally generated ticket value representation associated with the corresponding ticket record with a replacement ticket value representation associated with a high tier winning value from a prize structure for the game.

22. A computer storage system for securing lottery ticket information, comprising:

a first data storage component storing a lottery ticket generation file of game data, with the game data including a ticket validation number and an originally generated ticket value representation for each of the predetermined number of tickets, but wherein no game data for any of the predetermined number of tickets includes a ticket value representation associated with a high tier winning value; and a second data storage component separate and apart from the first data storage component, with the second data storage component storing a high tier seeded data file comprising a ticket validation number and corresponding ticket value representations that have been seeded with high tier winning value data wherein the high tier seeded data file is produced by inputting the game data from the lottery ticket generation file into a program that performs the process steps of: determining one or more lottery ticket books that have only zero and low-tier ticket value representations; creating a list of validation numbers associated with the zero-value tickets in the determined lottery ticket books; randomly selecting at least one validation number from the created list of validation numbers; and seeding the randomly selected validation number with a high tier winning ticket value representation that replaces the original ticket value representation associated with the selected validation number.

23. The system of claim 22 wherein the high tier winning ticket value representation is derived from a predetermined prize structure.

* * * * *